(12) United States Patent
Newmark (10) Patent No.: US 10,538,325 B1
(45) Date of Patent: Jan. 21, 2020

(54) UTILIZING UNMANNED VEHICLES TO INITIATE AND/OR FACILITATE CLAIMS PROCESSING

(71) Applicant: UNITED SERVICES AUTOMOBILE ASSOCIATION (USAA), San Antonio, TX (US)

(72) Inventor: Jordan Newmark, Fair Oaks Ranch, TX (US)

(73) Assignee: United Services Automobile Association, San Antonio, TX (US)

( * ) Notice: Subject to any disclaimer, the term of this patent is extended or adjusted under 35 U.S.C. 154(b) by 365 days.

(21) Appl. No.: 14/938,622

(22) Filed: Nov. 11, 2015

Related U.S. Application Data (60) Provisional application No. 62/077,997, filed on Nov. 11, 2014.

(51) Int. Cl.
| | |
|---|---|
| *B64C 39/02* | (2006.01) |
| *G05D 1/00* | (2006.01) |
| *G06Q 40/08* | (2012.01) |
| *H04W 4/021* | (2018.01) |
| *H04W 4/04* | (2009.01) |

(52) U.S. Cl.
CPC .......... *B64C 39/024* (2013.01); *G05D 1/0011* (2013.01); *G05D 1/0088* (2013.01); *G06Q 40/08* (2013.01); *H04W 4/021* (2013.01); *H04W 4/043* (2013.01); *B64C 2201/12* (2013.01); *B64C 2201/141* (2013.01); *B64C 2201/146* (2013.01)

(58) Field of Classification Search
CPC ...... G06Q 40/08; G06Q 10/087; G06Q 10/10; G06Q 30/0278; G06Q 30/0283; G06Q 40/00; G06Q 50/16
See application file for complete search history.

(56) References Cited

U.S. PATENT DOCUMENTS

| | | | | |
|---|---|---|---|---|
| 4,809,178 A | * | 2/1989 | Ninomiya | G05D 1/0255 318/587 |
| 5,742,335 A | * | 4/1998 | Cannon | G01M 11/081 348/135 |
| 8,346,578 B1 | * | 1/2013 | Hopkins, III | G06Q 40/00 382/100 |
| 8,427,632 B1 | * | 4/2013 | Nash | G01C 3/08 348/135 |
| 8,577,535 B2 | * | 11/2013 | Cummings | G06F 3/04815 701/2 |
| 8,818,572 B1 | * | 8/2014 | Tofte | B64C 39/024 701/2 |
| 9,129,355 B1 | * | 9/2015 | Harvey | G06T 7/0008 |
| 9,131,224 B1 | * | 9/2015 | Freeman | G01S 17/023 |
| 9,407,874 B2 | * | 8/2016 | Laurentino | H04N 7/155 |
| 9,927,809 B1 | * | 3/2018 | Tofte | G05D 1/0038 |
| 2005/0004753 A1 | * | 1/2005 | Weiland | G01C 21/32 701/532 |
| 2008/0078865 A1 | * | 4/2008 | Burne | F42B 12/365 244/1 R |

(Continued)

*Primary Examiner* — Redhwan K Mawari
(74) *Attorney, Agent, or Firm* — Baker Hostetler LLP (57) ABSTRACT

Unmanned vehicles can be terrestrial, aerial, nautical, or multi-mode. Unmanned vehicles may be used to survey a property in response to or in anticipation of damage to the property. For example, an unmanned vehicle may analyze information about the property and based on the information initiate an insurance claim for damage to the property.

20 Claims, 4 Drawing Sheets

(56) References Cited

U.S. PATENT DOCUMENTS

| | | | |
|---|---|---|---|
| 2009/0265193 A1* | 10/2009 | Collins | G06Q 30/0185 |
| | | | 705/4 |
| 2009/0326792 A1* | 12/2009 | McGrath | G01W 1/08 |
| | | | 701/120 |
| 2010/0194641 A1* | 8/2010 | Miller | G01S 5/04 |
| | | | 342/417 |
| 2010/0215212 A1* | 8/2010 | Flakes, Jr. | G01M 5/0025 |
| | | | 382/100 |
| 2012/0086939 A1* | 4/2012 | Henric | G01J 3/32 |
| | | | 356/301 |
| 2013/0278427 A1* | 10/2013 | Setton | G08B 21/12 |
| | | | 340/584 |
| 2014/0172194 A1* | 6/2014 | Levien | B64C 39/024 |
| | | | 701/2 |
| 2014/0316616 A1* | 10/2014 | Kugelmass | G05D 1/101 |
| | | | 701/8 |
| 2014/0344118 A1* | 11/2014 | Parpia | G06Q 10/087 |
| | | | 705/28 |
| 2015/0277442 A1* | 10/2015 | Ballou | B63H 25/04 |
| | | | 701/21 |
| 2016/0313736 A1* | 10/2016 | Schultz | B64D 47/08 |

* cited by examiner

UTILIZING UNMANNED VEHICLES TO INITIATE AND/OR FACILITATE CLAIMS PROCESSING

RELATED APPLICATIONS

This application claims the benefit of U.S. Provisional Patent Application No. 62/077,997, entitled "Systems and Methods for Utilizing Unmanned Vehicles to Facilitate Claims Processing," filed Nov. 11, 2014. The content of the above-referenced application is incorporated by reference herein in its entirety.

BACKGROUND OF THE INVENTION

Unmanned vehicles, such as unmanned aerial vehicles, are being mentioned increasingly as machines that will become more and more commonplace. U.S. Patent Publications 2014/0297065 and 2014/0277842 describe remote controlled devices, and, more particularly, to precisely controlling a remote aerial device for up-close inspection of a subject. However, these disclosures fail to describe the specifics of how an unmanned vehicle could be utilized to initiate and/or facilitate claims processing. Accordingly, there is an unmet need to utilize unmanned vehicles to initiate and/or facilitate claims processing.

SUMMARY

Described herein are systems and methods for initiating and/or facilitating claims processing, such as by utilizing unmanned vehicles. The vehicles can be terrestrial, aerial, nautical, or multi-mode. They can be remotely piloted, operate with an autopilot, or a combination of both. This process may serve the diverse data needs of multiple entities, with only a single entity engaged in the execution of the mission. The vehicles can be terrestrial, aerial, nautical, or multi-mode. They can be remotely piloted, operate with an autopilot, or a combination of both.

In one example, a computer-implemented method for controlling an unmanned remote vehicle may include receiving, over a network, first position data indicating a position of the remote vehicle. Second position data indicating a position of a target location proximate to a property is received. A processor causes the remote vehicle to move toward the target location. Proximal sensor data is received indicating one or more proximal obstructions located in a path between the remote vehicle and the target location. An action instruction is sent indicating an observation location for the remote vehicle to avoid the one or more proximal obstructions. A processor causes the remote vehicle to move to the observation location. Remote vehicle sensor data is received indicating one or more damage conditions of the property. An insurance claim is initiated in response to receipt of the one or more damage conditions.

In one example, a device may include a processor and a memory. The memory may be coupled with the processor and store instructions that when executed the processor cause the processor to effectuate operations such as receiving first position data indicating a position of a remote vehicle; receiving second position data indicating a position of a target location proximate to a property; causing the remote vehicle to move toward the target location; receiving proximal sensor data indicating one or more proximal obstructions located in a path between the remote vehicle and the target location; sending an action instruction indicating an observation location for the remote vehicle to avoid the one or more proximal obstructions; causing, by a processor, the remote vehicle to move to the observation location; receiving remote vehicle sensor data indicating one or more damage conditions of the dwelling; and initiating an insurance claim in response to receipt of the one or more damage conditions.

In one embodiment, described herein are systems and methods for initiating and/or facilitating claims processing, such as by utilizing unmanned vehicles. The vehicles can be terrestrial, aerial, nautical, or multi-mode. They can be remotely piloted, operate with an autopilot, or a combination of both. This process may serve to initiate and/or facilitate claims processing, such as by utilizing unmanned vehicles. In one example, an unmanned vehicle is utilized to gather data related to one or more insurance claims. The unmanned vehicle may be sent on a mission to gather data over an area that has recently been subject to an event that caused widespread damage (e.g., hurricane). The unmanned vehicle may process the data internally before forwarding the data to a central server, and the data may be forwarded during the mission, or after the mission is complete. The data from the unmanned vehicle may be shared between multiple entities and utilized to initiate or accelerate processing of claims against insurance policies.

In one example, an unmanned vehicle including a processor and a memory coupled with the processor is provided. The memory includes executable instructions that when executed by the processor cause the processor to effectuate operations comprising maneuvering the unmanned vehicle to a first location proximate a property; receiving sensor data indicating an obstruction between the location and the property; maneuvering the unmanned vehicle to a second location proximate a property, wherein the obstruction is not location between the second location and the property; analyzing information about the property, wherein the information about the property comprises an image captured by one or more sensors of the unmanned vehicle; and based on the analyzed information about the property, providing instructions to a device to initiate an insurance claim for the property.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Remote unmanned vehicles may be used to survey a property in response to or in anticipation of damage to the property. For example, an unmanned vehicle may analyze information about the property and based on the information initiate an insurance claim or facilitate processing an insurance claim for the property. This disclosure relates at least in part to identifying how unmanned vehicles may facilitate and/or initiation delivery of a service, such as claims processing. The unmanned vehicle may be terrestrial, aerial, nautical, or multi-mode.

Figure 1:
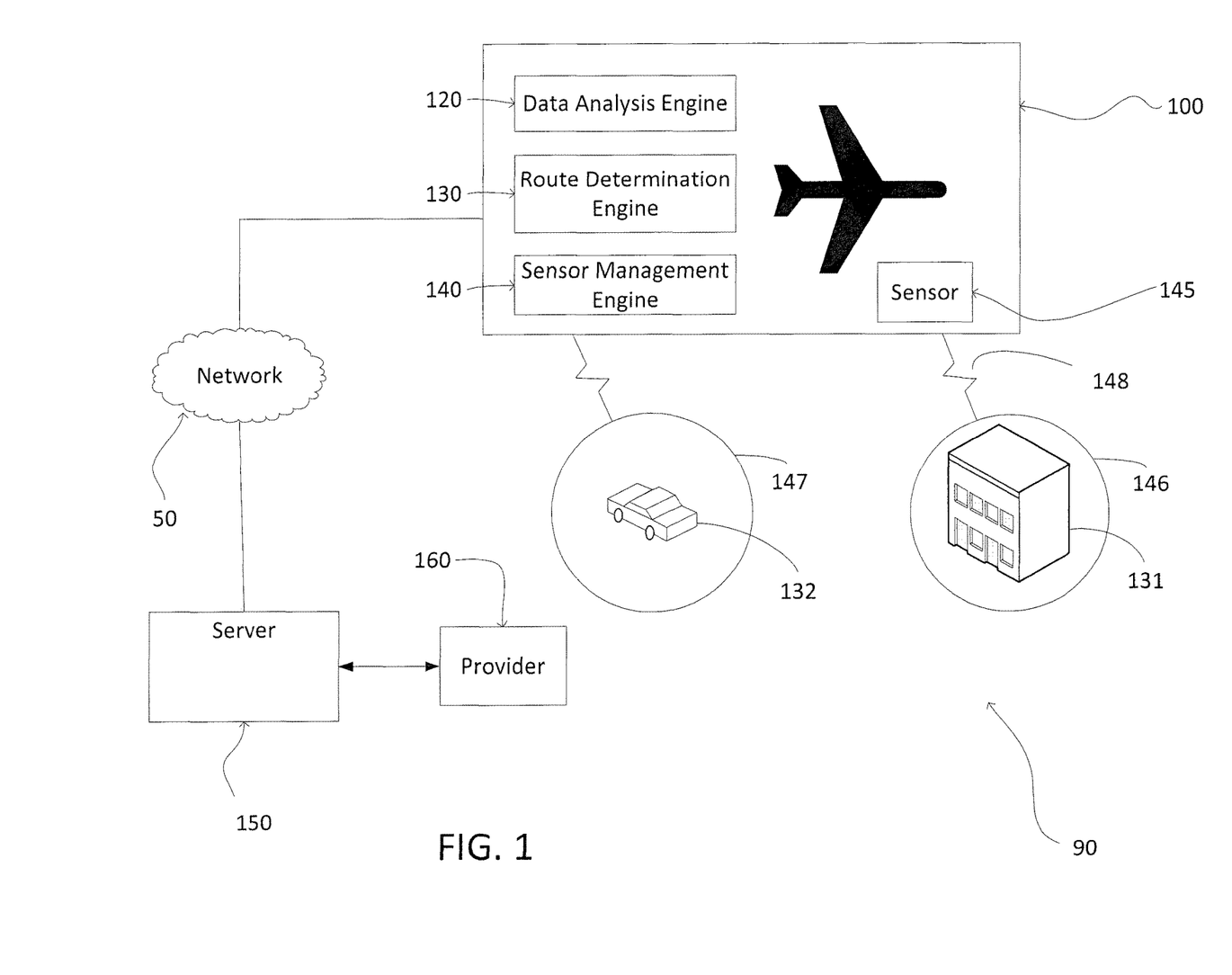
FIG. 1 illustrates an exemplary system associated with unmanned vehicle surveillance of a property.

FIG. 1 illustrates an exemplary system 90 associated with unmanned vehicle surveillance of a property. Unmanned vehicle 100 includes one or more instance of sensor 145, data analysis engine 120, route determination engine 130, and sensor management engine 140. Unmanned vehicle 100 may be communicatively connected with network 50 and server 150. A provider 160, such as a business (e.g., an insurance provider) may own or have control of unmanned vehicle 100, network 50, or server 150. Structure 131 (e.g., a commercial building or home) is located in area 146 and vehicle 132 (e.g., an automobile, motorcycle, or boat) is located in area 147. Unmanned vehicle may be operated remotely by provider 160 over network 50 or may be operated in a self-driving or self-operating mode of operation.

Figure 4:
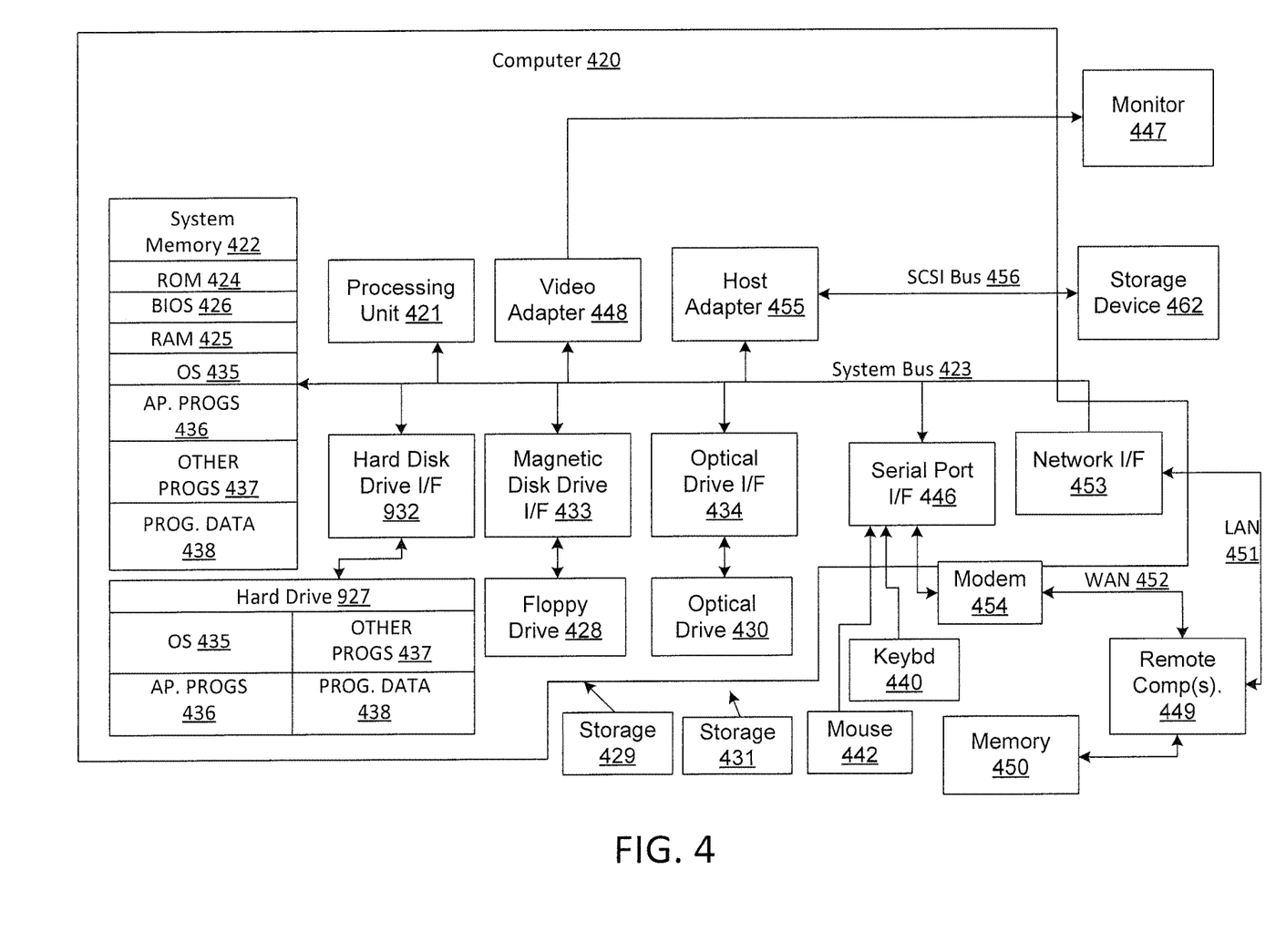
FIG. 4 is an exemplary block diagram representing a computer system in which aspects of the methods and systems disclosed herein or portions thereof may be incorporated.

With continued reference to FIG. 1, data analysis engine 120, route determination engine 130, and sensor management engine 140 are logical entities that may be implemented in the form of software (e.g., computer-executable instructions) stored in a memory of, and executing on a processor of unmanned vehicle 100, server 150, or another computer system such as illustrated in FIG. 4. Data analysis engine 120 may analyze data retrieved by sensor 145. Analysis by data analysis engine 120 may include comparing image data to stored data to identify additional or replacement images that may need to be gathered. It should be noted that, when performing the functionality described herein, the unmanned vehicle 100 may operate autonomously, semi autonomously, or under the direction of an operator. For instance, unmanned vehicle 100 may be pre-programmed to carry out the functionality described herein. In another embodiment, unmanned vehicle 100 may send data over network to server 150 and/or provider, which may then control certain functions of unmanned vehicle 100. In another example, an operator may control unmanned vehicle 100.

In one example, sensor 145 may include one or more instance of navigational sensors and data analysis engine 120 may utilize navigational data to help navigate unmanned vehicle 100. Navigational sensors may include location sensors, such as GPS, that identify the location of unmanned vehicle 100 and/or proximate sensors (e.g. radar, sonar, cameras, laser guidance, etc.) that identify objects near unmanned vehicle 100. It should be noted that unmanned vehicle 100 may include a plurality of sensors 45 and sensor types.

In one example, unmanned vehicle 100 may be deployed to inspect a property, such as structure 131 or vehicle 132. Unmanned vehicle may be maneuvered to a location proximate to the property, such as a location within an area 146 or area 147. Upon inspection, data analysis engine 120 may determine that data retrieved by sensor 145 is incomplete due to there being one or more obstructions between sensor 145 and the property. In another example, data analysis engine 120 may determine that sensor 145 is unable to receive any information about a property due to there being one or more obstructions between the sensor 145 and the property. In a further example, data analysis engine 120 may receiving sensor 145 data regarding the location and/or surroundings of unmanned vehicle 100 and determine that one or more obstructions are positioned between unmanned vehicle 100 and a property such that unmanned vehicle 100 may not be able to navigate to a location proximate to the property. Accordingly, data analysis engine 120 may send information regarding one or more obstructions to route determination engine 130.

Route determination engine 130 may be utilized to manage unmanned vehicle 100, which may include confirming that unmanned vehicle 100 remains on a planned path based on a particular mission. Route determination engine 130 may also determine modifications to a route of unmanned vehicle 100 based on gathered data. For example, if additional images are needed of a certain location, which may include a different perspective or angle, route determination engine 130 may request unmanned vehicle 100 to vary the planned path accordingly, which may change the parameters of the mission.

In one example, route determination engine 130 may cause the unmanned vehicle 100 to navigate to a target location. The target location may be proximate to a property of interest. Route determination engine 130 may receive information from data analysis engine 120 that there are one or more obstructions located between the unmanned vehicle 100 and the target location such that the sensors 145 will not be able to receive data (or will receive incomplete data) regarding the property. Route determination engine 130 may calculate a route to another observation location from which the sensors 145 will be able to receive complete data regarding the property. Route determination engine 130 then may cause the unmanned vehicle 100 to navigate to the other location.

Sensor management engine 140 controls sensor 145. This control may include determining which sensor of a plurality of sensors are gathering data, the operating characteristics of said data gathering (e.g., the level of zoom of a visible light camera), where sensor 145 is aimed, or any other sensor performance control variables as would be recognized by those skilled in the art. It is contemplated herein that sensor 145 may include a visible light camera, an infrared camera, a microphone, a particle inspection device (e.g., a device that can detect what compounds are in sampled air gathered by unmanned vehicle 100), radar emitting/detecting device(s), a spectrometer, a hyperspectral sensor, a temperature sensor, a humidity sensor, a gas sensor, or a navigation (e.g. GPS) sensor, among other things.

Figure 2:
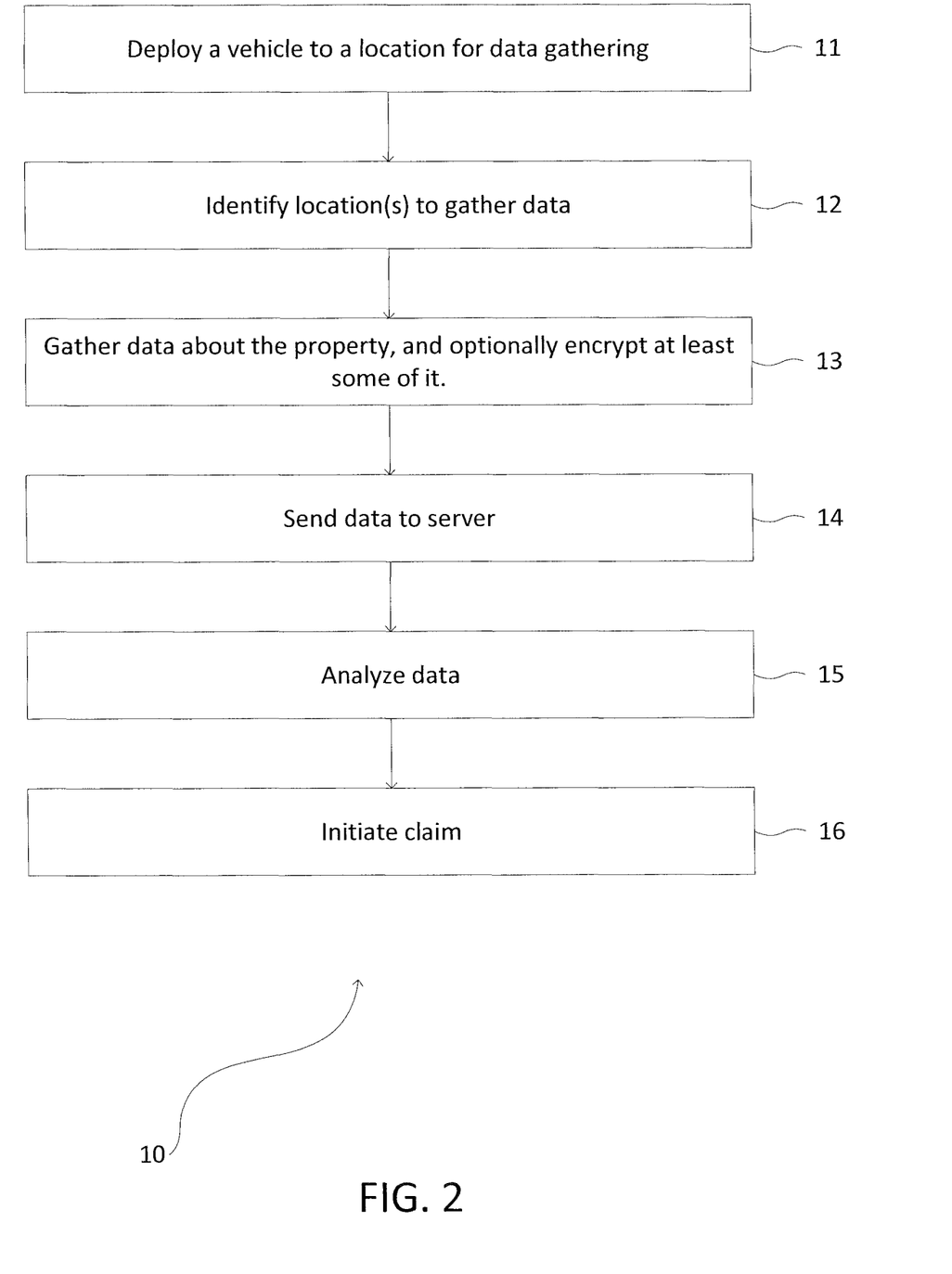
FIG. 2 is a flowchart depicting illustrative operation of the system of FIG. 1.

Turning now to FIG. 2, illustrated herein is a method 10 associated with managing an unmanned vehicle 100. At step 11, unmanned vehicle 100 is deployed to structure 131 (i.e., a property). This deployment may be in response to a notification that structure 131 has been damaged (e.g., structure 131 owner contacted his/her insurance company), or this deployment may be in response to an event that caused damage in and around structure 131 (e.g., a nearby tornado), or this deployment may be simply a periodic deployment to gather additional information.

In one exemplary use case, unmanned vehicle 100 is deployed to a location via two spatial position data points being transmitted to and/or generated at the unmanned vehicle 100. Spatial position data points may include a geographic location and an altitude. The first location data point relates to a location of unmanned vehicle 100 (e.g., a GPS location of where the unmanned vehicle 100 presently is, a GPS location of where the unmanned vehicle 100 is near, a GPS location of where the unmanned vehicle 100 is expected to be located, a relative location of where the unmanned vehicle 100 is at or near (e.g., a delta of the difference in the location of the unmanned vehicle 100 as compared to a, preferably known, location of another object)). The second location data point may relate to a target location. The target location may be, for exemplary purposes only and without limitation, a property that is insured, a property that contains a structure 131 or another object (vehicle 132), an area 146, 147 located at or near a structure 131 or object that is insured, and/or an area near a plurality of properties and/or dwellings that are insured.

Continuing with this exemplary use case, the unmanned vehicle 100 may be provided with a first instruction to traverse from the first spatial data point to the second spatial data point, as well as being provided a second instruction to avoid one or more (proximal) obstructions that may be in a path and/or near a path between the first and second. These instructions may be for anticipatory avoidance (e.g., the unmanned vehicle 100 not coming close to approaching the obstruction) and/or they may relate to reactionary guidelines (e.g., avoidance maneuvers when encountering obstructions. In one example, the unmanned vehicle 100 may be commanded or programmed to ignore obstructions that are not within a predetermined distance of unmanned vehicle or its payt.

After the unmanned vehicle 100 arrives at the target location, at step 12, the unmanned vehicle 100 may be instructed to identify a plurality of locations from which it may gather sensor data about a property. For example, when inspecting a structure 131, in one exemplary method for conducting reconnaissance, the unmanned vehicle 100 may typically and initially first locate itself at four different locations, such as locations 310A, 310B, 310C, and 310D shown in FIG. 3, and locations 320A, 320B, 320C, and/or 320D may be utilized as secondary observational locations. Optionally, the initial reconnaissance locations may be 320A, 320B, 320C, and 320D shown in FIG. 3.

Figure 3:
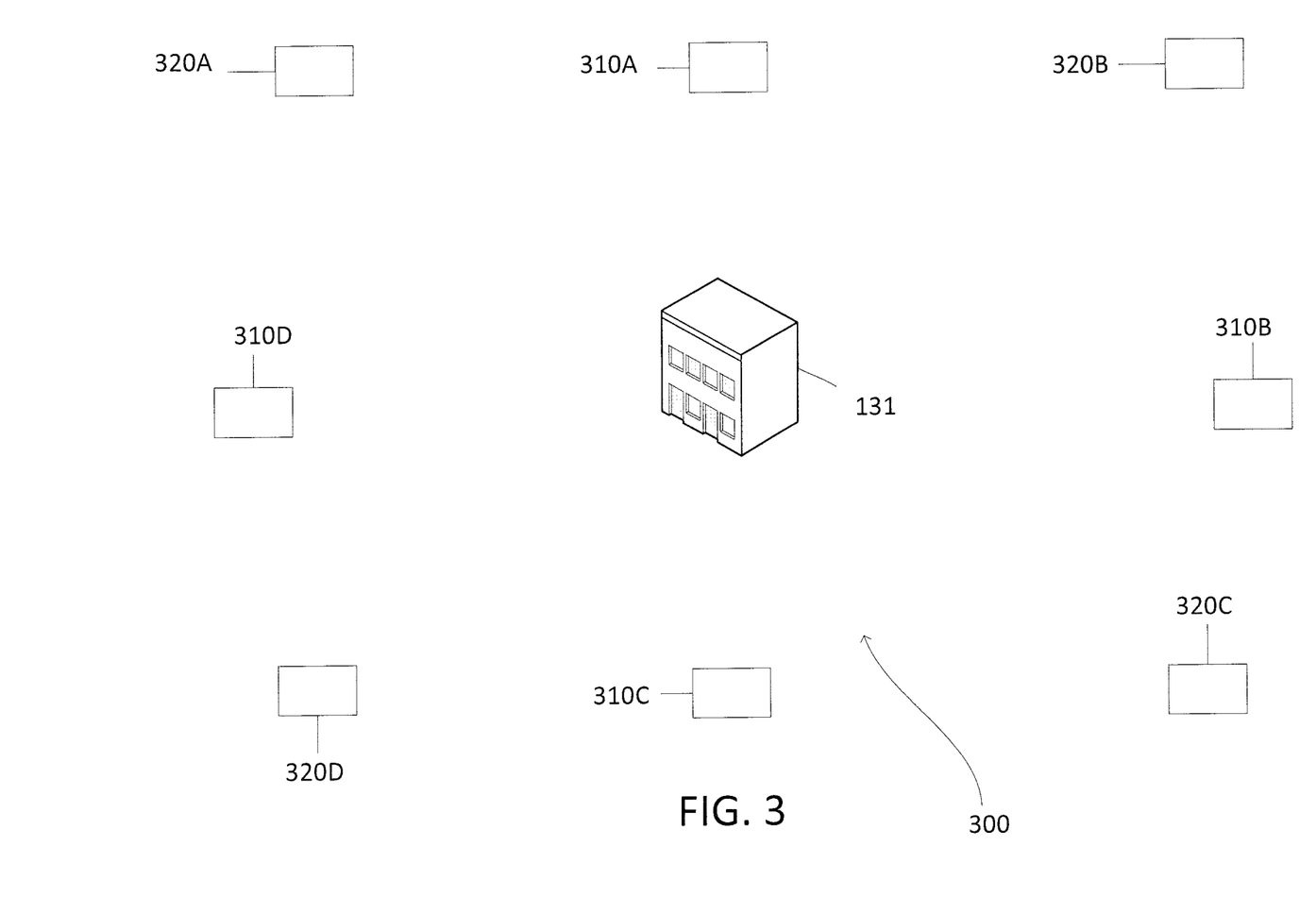
FIG. 3 depicts exemplary data gathering locations that may be utilized by the system of FIG. 1.

It is contemplated herein that the above-identified locations may be where the unmanned vehicle 100 hovers and/or stabilizes itself while one or more pieces of data are collected (e.g., visual light via a still image and/or a video). It is further contemplated herein that the above-identified locations may be locations that the unmanned vehicle 100 traverses at a regular and/or typical traveling speed while the one or more pieces of data are collected.

Data analysis engine 120 and route determination engine 130 may manage the unmanned vehicle 100 (e.g., specific directions regarding speed, height, and/or direction), and/or generally operate the unmanned vehicle 100. For exemplary purposes only and without limitation, data analysis engine 120 and route determination engine 130 may select an object and/or property to inspect, and the unmanned vehicle 100 may determine a method of traveling to and/or around that object and/or property. It is further contemplated herein that the controller may select a relative location (e.g., locations 310D and/or 310B) and the unmanned vehicle 100 may determine the method of traveling to the one or more selected locations relative to the object and/or property being inspected.

To navigate to the target position at and/or near the property/properties (this example will proceed with the singular "property", although it is contemplated herein that this methodology could be extrapolated and applied to multiple properties) to be inspected, the unmanned vehicle 100 may receive the position of the property to be inspected and the position of the unmanned vehicle 100. Based on the combination of these two position data points, the unmanned vehicle 100 may first calculate and then navigate to the position of the property. While navigating to the property, the unmanned vehicle 100 may receive an instruction to avoid one or more obstructions, known or unknown, that may be at or near the path between the unmanned vehicle 100 and the target location.

In one embodiment, the unmanned vehicle 100 may determine an initial reconnaissance pattern and, based on data gathered initially, the unmanned vehicle 100 may itself determine additional reconnaissance patterns. For example, if the unmanned vehicle 100 initially receives data on the initial recon that identifies visible damage to the roof of a property, the unmanned vehicle 100 may conduct additional recon via infrared detection (such as from a closer distance).

The unmanned vehicle 100 may include a stabilization functionality and/or engine that assists the unmanned vehicle 100 in gathering data. This stabilizing functionality may be general to the unmanned vehicle 100 entirely (e.g., gyroscopes to help level the unmanned vehicle 100), and/or specific to one or more sensors. For example, it is contemplated herein that the stabilizing module may be on a platform of the unmanned vehicle 100 that houses the one or more sensors 45. The stabilizing functionality may be constantly enabled as the unmanned vehicle 100 is being operated, and/or it may only be engaged when the unmanned vehicle 100 is gathering data.

In addition to and/or alternative to radar, it is contemplated herein that the unmanned vehicle 100 may have other proximity sensors as would be recognized by those skilled in the art. For exemplary purposes only and without limitation, the unmanned vehicle 100 may use three dimensional imagery to determine the location of other objects, radar, lasers, and/or any means as known in the art. The unmanned vehicle 100 may utilize the determined and/or estimated location of other objects to assist the unmanned vehicle 100 while navigating. For example, if the unmanned vehicle 100 is collecting data about one or more insured properties (real and/or personal), the unmanned vehicle 100 may determine that an object (e.g., a tree, a tower) is either in the way for where the unmanned vehicle 100 wants to go and/or too close to the path that the unmanned vehicle 100 wants to traverse.

In step 13, the unmanned vehicle 100 receives an instruction to gather data about a property. The unmanned vehicle 100 receives and/or generates itself a navigational plan to arrive at the property, and as the unmanned vehicle 100 navigates to the property the unmanned vehicle 100 may make measurements to determine where objects (e.g., trees) are. If the unmanned vehicle 100 determines that another object (e.g., another flying object) is and/or will be dangerously close to the unmanned vehicle 100 (e.g., closer than a predetermined threshold), then the unmanned vehicle 100 may alter and/or pause its navigational plan.

While gathering data, the unmanned vehicle 100 may include general guidelines to maintain a specific altitude and/or an altitude range for those locations. For example, the unmanned vehicle 100 may take the initial images at an altitude of 100 feet. It is contemplated herein that the unmanned vehicle 100 may operate at an altitude that is at least partially dependent on which sensors are being utilized. For example, if visible light is being measured then the altitude is determined based on requiring the visible light camera not having to take imagery larger than a predetermined distance (e.g., 150 feet), and if the infrared sensor is being utilized then the altitude may be determined based on a different imagery distance (e.g., 75 feet), and/or if the microphone is being utilized then the altitude may be calculated and determined based on yet another data measurement distance (50 feet).

The unmanned vehicle 100 may be instructed to travel at a selected rate of speed. It is contemplated herein that this rate of speed may be with respect to the surrounding air and/or with respect to the ground. After being instructed to travel at the selected speed, the unmanned vehicle 100 may monitor surrounding items (e.g., the air, the ground) to dynamically and/or constantly determine the unmanned vehicle 100's rate of speed at a given moment in time.

In step 15, the data may be analyzed. Analysis of the data may occur by unmanned vehicle 100, server 50, provider 160, or some combination thereof. Previously gathered data (e.g., from a previous day/week/month/year) may be compared to real-time gathered data. This comparison may enable the identification of a part of structure 131 that may be left or a part of structure that does not exist anymore. For example, if the real-time image discloses some rubble or one or more walls of a structure, the comparison to the previously-gathered image may reveal that the structure at that location has been partially or (almost) completely destroyed. Other examples include, but are not limited to, using thermal sensor data to detect hot spots where pipes have been destroyed, or using sonar data to detect missing internal structures.

In one embodiment, communications may occur between unmanned vehicle 100 and structure 131 (e.g., a smart home system may be executed). It is contemplated herein that structure 131 may include any type of electronic-based system that is involved with managing/monitoring/controlling a property. For example, structure 131 may monitor what appliances are being operated, what the conditions are (what rooms have movement, what temperature each room is), or actually controls aspects of the structure (e.g., if no one is home, reset the thermostat to a temperature that is less expensive to maintain). Further, although the terminology "smart home" is used herein, it is contemplated herein that the concept is applicable to any residential, commercial, or industrial property as would be recognized by those skilled in the art.

At step 14, data may be communicated back to a (central) server or a cloud service. For example, the vehicle may communicate via any available communication link (e.g., via a satellite link) back to server 150. In another example, unmanned vehicle 100 may leverage a communication link with structure 131 to send data to server 150. For example, unmanned vehicle 100 may send the data to structure 131, and structure 131 may utilize its own communication link (e.g., its own ISP (Internet Service Provider)) to forward the data along).

It is contemplated herein that the data gathered about structure 131 may be any data as described herein, and gathered from any of the sensors that are also described and referenced herein. Further, unmanned vehicle 100 may be enabled with functionality to analyze gathered data (e.g., an image) and determined whether the image sufficiently contains what is needed. For example, if unmanned vehicle 100 has been tasked with identifying the status of a residential home, and the vehicle gathers a visual image of the home from a relatively large distance (e.g., 1,000 feet), the image may be analyzed to determine that a closer or more zoomed-in image is needed to enable the functionality and analysis related to identifying what damage, if any, has occurred to the home.

In another example, unmanned vehicle 100 may communicate with a computing device that manages, at least in part, structure 131 in area 146 (e.g., a smart home). It is contemplated herein that the communication link may be via Wi-Fi, Bluetooth, radio frequency, or the like as would be known and recognized by those skilled in the art.

In another example, unmanned vehicle 100 may analyze data about a property (e.g., an image) to determine that additional data may be required. As a result, unmanned vehicle 100 may request a second unmanned vehicle (not shown) to gather the additional data. It is contemplated herein that the request may be communicated directly from unmanned vehicle 100 to the second unmanned vehicle, or it may be via unmanned vehicle 100 communicating that additional data is needed, and that request being forwarded to a second unmanned vehicle that has been identified as a result of the need for additional data.

In another example, unmanned vehicle 100 may identify a problem and instruct structure 131 to address that problem. For example, unmanned vehicle 100 may identify that gas is leaking (e.g., via visual detection of a problem with a pipe, via detecting the gas in the air), and instruct structure 131 to shut off (e.g., an emergency shut off) the gas. Further, it is contemplated herein that this may also be applied to leaking water or any other problem that structure 131 may be leveraged to mitigate the possibility of additional damage being caused because of that.

In another example, a first set of data is gathered (e.g., zoomed out optical imagery), and from that data it is analyzed and determined a priority of what property needs more data gathered therefrom (e.g., if damage is still occurring to structure 131, such as e.g., an active fire burning a part of the house) then gathering more data about structure 131's instant damage state may prove insignificant as structure 131 will likely end up being additionally damaged, and thus, structure 131 should be a low priority with regards to gathering additional data at this time.

In another example, tiers of data are collected, such as, for exemplary purposes only and without limitation, visual light image data, hyperspectral image data, infrared data. Said tiers may be handled, distributed, or analyzed alone or in combination.

In another example, unmanned vehicle 100 may take imagery that is analyzed to determine if structure 131 has sustained structural or roof damage. For example, the engines on unmanned vehicle 100 or engines on server 150 may analyze the data (e.g., image data) to determine if a roof at a certain coordinate has all of the corners and edges and whether said corners and edges of said roof appear to be damaged. In another example, the engines on unmanned vehicle 100 or engines on server 150 may analyze the data (e.g., image data) to determine the extent of damage that has occurred (e.g., the percentage of damage to a component (e.g., roof) of structure 131, the percentage of damage to an insured entity (e.g., vehicle 132), or the percentage of damage to an area 146 that may have multiple structures. In this or other examples, the engines on unmanned vehicle 100 or engines on server 150 may determine and identify which part of a structure 131 is damaged (e.g., roof, walls, windows, porch, or personal property).

At step 16, unmanned vehicle 100 may initiate an insurance claim based on data analyzed in step 15. Initiation of a claim may occur based on a determination that damage to a property has occurred. In one embodiment, initiation of a claim may occur by sending a communication over network to provider 160 indicating that a claim should be initiated due to property damage. Such a communication may include a damage estimate created by unmanned vehicle 100 utilizing sensor 45 data. Provider 160 would then evaluate the claim and process the claim in accordance with its business rules.

In another embodiment, unmanned vehicle 100 may include the business rules and functionality to create and process a claim without reference to provider 160. For instance, unmanned vehicle may act as automated insurance adjuster. Unmanned vehicle 100 may create a damage estimate and process the claim. For instance, unmanned vehicle 100 may transmit the damage estimate to an insured. The insured may receive damage estimate and indicate acceptance of the claim. The unmanned vehicle 100 may then transmit payment of the claim to the insured in real-time.

In another embodiment, some combination of the preceding embodiments may be utilized. For instance, the unmanned vehicle 100 may notify provider 160 of the damage estimate. The provider may transmit a communication to the unmanned vehicle 100 that it has authority to pay the claim up to a certain maximum. The unmanned vehicle 100 may then negotiate and settle the claim with the insured.

In another embodiment, the unmanned vehicle may be utilized to facilitate claims processing. For instance, provider 160 may have an open claim with an insured. Provider may deploy unmanned vehicle 100 to perform an inspection of a structure 131. Unmanned vehicle may then transfer data to provider 160. Provider 160 may then utilize the data to determine whether to pay a claim, deny a claim, or adjust a claim.

The present disclosure is directed to unmanned vehicle service delivery. The present disclosure is not limited in any way to the examples, which can be applicable in various forms, as appreciated by one skilled in the art. Therefore, it is to be understood that any terms, phrases, structural and functional details, disclosed herein are merely a basis for the claims and as a representative for teaching one skilled in the art to variously employ the present disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

One skilled in the art will appreciate further features and advantages based on the described examples. Accordingly, the disclosure is not to be limited by what has been particularly shown and described, except as indicated by the appended claims. Further, although at least one series of steps are presented as an exemplary method of practicing one or more examples described herein, it will be appreciated by those skilled in the art that the steps identified may be practiced in any order that is practicable, including without limitation the omission of one or more steps.

It is to be appreciated that network 50 depicted in FIG. 1, for example, may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, system 90 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 90, or portions thereof, may be stored in a remote memory storage device such as storage medium. Computing devices may communicate over network 50 through one or more communications links 75 formed between data interfaces. Communication links 75 may comprise either wired or wireless links. It is to be appreciated that the illustrated network connections in the figures (e.g., FIG. 1 or FIG. 9) are exemplary and other ways of establishing a communications link between multiple devices may be used.

FIG. 4 and the following discussion are intended to provide a brief general description of a suitable computing environment in which the methods and systems disclosed herein or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 4 is a block diagram representing a general purpose computer system in which aspects of the methods and systems disclosed herein and/or portions thereof may be incorporated. As shown, the exemplary general purpose computing system includes a computer 420 or the like, including a processing unit 421, a system memory 422, and a system bus 423 that couples various system components including the system memory to the processing unit 421. The system bus 423 may be any of several types of bus structures including a memory bus or memory controller, a peripheral bus, and a local bus using any of a variety of bus architectures. The system memory includes read-only memory (ROM) 424 and random access memory (RAM) 425. A basic input/output system 426 (BIOS), containing the basic routines that help to transfer information between elements within the computer 420, such as during start-up, is stored in ROM 424.

The computer 420 may further include a hard disk drive 427 for reading from and writing to a hard disk (not shown), a magnetic disk drive 428 for reading from or writing to a removable magnetic disk 429, and an optical disk drive 430 for reading from or writing to a removable optical disk 431 such as a CD-ROM or other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide non-volatile storage of computer readable instructions, data structures, program modules and other data for the computer 420. As described herein, computer-readable media is a tangible, physical, and concrete article of manufacture and thus not a signal per se.

Although the exemplary environment described herein employs a hard disk, a removable magnetic disk 429, and a removable optical disk 431, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 429, optical disk 431, ROM 424 or RAM 425, including an operating system 435, one or more application programs 436, other program modules 437 and program data 438. A user may enter commands and information into the computer 420 through input devices such as a keyboard 440 and pointing device 442. Other input devices (not shown) may include a microphone, joystick, game pad, satellite disk, scanner, or the like. These and other input devices are often connected to the processing unit 421 through a serial port interface 446 that is coupled to the system bus, but may be connected by other interfaces, such as a parallel port, game port, or universal serial bus (USB). A monitor 447 or other type of display device is also connected to the system bus 423 via an interface, such as a video adapter 448. In addition to the monitor 447, a computer may include other peripheral output devices (not shown), such as speakers and printers. The exemplary system of FIG. 4 also includes a host adapter 455, a Small Computer System Interface (SCSI) bus 456, and an external storage device 462 connected to the SCSI bus 456.

The computer 420 may operate in a networked environment using logical connections to one or more remote computers, such as a remote computer 449. The remote computer 449 may be a personal computer, a server, a router, a network PC, a peer device or other common network node, and may include many or all of the elements described above relative to the computer 420, although only a memory storage device 450 has been illustrated in FIG. 4. The logical connections depicted in FIG. 4 include a local area network (LAN) 451 and a wide area network (WAN) 452. Such networking environments are commonplace in offices, enterprise-wide computer networks, intranets, and the Internet.

When used in a LAN networking environment, the computer 420 is connected to the LAN 951 through a network interface or adapter 453. When used in a WAN networking environment, the computer 420 may include a modem 454 or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

Computer 420 may include a variety of computer readable storage media. Computer readable storage media can be any available media that can be accessed by computer 420 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 420. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An unmanned vehicle comprising:
a processor; and
a memory coupled with the processor, the memory having stored thereon executable instructions that when executed by the processor cause the processor to effectuate operations comprising:
maneuvering the unmanned vehicle to a first location proximate a property;
receiving sensor data indicating an obstruction between the first location and the property;
determining that a current distance between the obstruction and unmanned vehicle meets or exceeds a threshold distance;
based on the determining that the current distance meets or exceeds the threshold distance, maneuvering the unmanned vehicle to a second location proximate the property, wherein the obstruction is not located between the second location and the property;
generating data associated with the property;
analyzing the data;
based on the analyzing the data, determining if damage is still occurring to the property; and based on determining that damage is not still occurring to the property, generating additional data associated with the property.

2. The unmanned vehicle of claim 1, wherein the unmanned vehicle comprises an aerial device; and
at least one of the first location and the second location comprises spatial position data.

3. The unmanned vehicle of claim 2, wherein the spatial position data comprises at least one of a geographic location and an altitude.

4. The unmanned vehicle of claim 1, wherein the sensor data indicates that the obstruction would prevent the unmanned vehicle from generating the data at the first location.

5. The unmanned vehicle of claim 1, wherein the unmanned vehicle comprises at least one of a visible light camera, an infrared camera, and a hyperspectral sensor.

6. The unmanned vehicle of claim 1, wherein the unmanned vehicle comprises at least one of a temperature sensor, a humidity sensor, and a gas sensor.

7. The unmanned vehicle of claim 1, wherein the operations further comprise:
determining proximity to another vehicle; and
based on the proximity to the another vehicle, modifying a current path of travel of the unmanned vehicle.

8. A method comprising:
maneuvering an unmanned vehicle to a first location proximate a property;
receiving sensor data indicating an obstruction between the first location and the property;
determining that a current distance between the obstruction and unmanned vehicle meets or exceeds a threshold distance;
based on the determining that the current distance meets or exceeds the threshold distance, maneuvering the unmanned vehicle to a second location proximate the property, wherein the obstruction is not located between the second location and the property;
generating data associated with the property;
analyzing the data;
based on the analyzing the data, determining if damage is still occurring to the property; and
based on determining that damage is not still occurring to the property, generating additional data associated with the property.

9. The method of claim 8, wherein the unmanned vehicle comprises an aerial device; and
at least one of the first location and the second location comprises spatial position data.

10. The method of claim 8, wherein the data comprises at least one of a geographic location and an altitude.

11. The method of claim 8, wherein the sensor data indicates that the obstruction would prevent the unmanned vehicle from generating the data from the first location.

12. The method of claim 8, wherein the unmanned vehicle comprises a radar device.

13. The method of claim 8, wherein the unmanned vehicle comprises a particle inspection device.

14. A system comprising:
an unmanned vehicle; and
a controller in communication with the unmanned vehicle, wherein the controller is configured to:
send, to the unmanned vehicle, data configured to cause the unmanned vehicle to travel to a first location proximate a property;
receive sensor data indicating an obstruction between the first location and the property;
determine that a current distance between the obstruction and unmanned vehicle meets or exceeds a threshold distance;
based on determining that the current distance meets or exceeds the threshold distance, send, to the unmanned vehicle, data configured to cause the unmanned vehicle to travel to a second location proximate the property, wherein the obstruction is not located between the second location and the property;
receive, from the unmanned vehicle, data associated with the property generated from a determined altitude;
analyze the data;
based on analyzing the data, determine if damage is still occurring to the property; and
based on determining that damage is not still occurring to the property, generate additional data associated with the property.

15. The system of claim 14, wherein the unmanned vehicle comprises an aerial device; and
at least one of the first location and the second location comprises spatial position data.

16. The system of claim 14, wherein the data comprises at least one of a geographic location and an altitude.

17. The system of claim 14, wherein the sensor data indicates that the obstruction would prevent the unmanned vehicle from generating the data from the first location.

18. The system of claim 14, wherein the unmanned vehicle comprises a spectrometer.

19. The system of claim 14, wherein the unmanned vehicle comprises a temperature sensor and a gas sensor.

20. The system of claim 14, wherein the controller is located external to the property.

* * * * *